US012046907B2

(12) United States Patent
Balasubramanian et al.

(10) Patent No.: US 12,046,907 B2
(45) Date of Patent: Jul. 23, 2024

(54) MULTI-LAYER ARCHITECTURE FOR CONTROL OF DISTRIBUTED ENERGY RESOURCES

(71) Applicant: Eaton Intelligent Power Limited, Dublin (IE)

(72) Inventors: Pranavamoorthy Balasubramanian, Chennai (IN); Debasmita Das, Bangalore (IN); Chaitanya Ashok Baone, Arvada, CO (US); David Wu Ganger, Lakewood, CO (US); Qiang Fu, Arvada, CO (US); Sumedh Shashikant Puradbhat, Pune (IN); Amit Govind Kolge, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 309 days.

(21) Appl. No.: 17/458,655

(22) Filed: Aug. 27, 2021

(65) Prior Publication Data
US 2023/0068308 A1    Mar. 2, 2023

(51) Int. Cl.
| | |
|---|---|
| *H02J 3/38* | (2006.01) |
| *G05B 13/02* | (2006.01) |
| *G06Q 10/0631* | (2023.01) |
| *G06Q 10/0637* | (2023.01) |
| *G06Q 30/018* | (2023.01) |
| *G06Q 50/06* | (2012.01) |
| *H02J 13/00* | (2006.01) |
| *H04L 67/12* | (2022.01) |

(52) U.S. Cl.
CPC ............ *H02J 3/381* (2013.01); *G05B 13/021* (2013.01); *G06Q 10/06313* (2013.01); *G06Q 10/06375* (2013.01); *G06Q 30/018* (2013.01); *G06Q 50/06* (2013.01); *H02J 13/00006* (2020.01); *H04L 67/12* (2013.01); *H02J 2203/20* (2020.01)

(58) Field of Classification Search
CPC .. H02J 3/381; H02J 13/00006; H02J 2203/20; G05B 13/021; G06Q 10/06313; G06Q 10/06375; G06Q 30/018; G06Q 50/06; H04L 67/12
USPC ........................................................ 700/287
See application file for complete search history.

(56) References Cited

U.S. PATENT DOCUMENTS

| | | | |
|---|---|---|---|
| 2015/0094968 A1* | 4/2015 | Jia ........................... | G05B 15/02 702/60 |
| 2016/0072287 A1* | 3/2016 | Jia ......................... | H02J 3/0073 700/295 |

* cited by examiner

*Primary Examiner* — Mohammad Ali
*Assistant Examiner* — Saad M Kabir
(74) *Attorney, Agent, or Firm* — Talem IP Law, LLP

(57) ABSTRACT

A multi-layer architecture for control of distributed energy resources (DER) includes a forecasting and optimization system and one or more site-level controllers. The forecasting and optimization system generates predictions of optimal set points and communicate the optimal set points to a site-level controller. The site-level controller includes stored instructions that, when executed, direct the site-level controller to perform a boundary check and a real-time static economic dispatch, which can include steps of receiving optimal set points from the forecasting and optimization system; comparing received optimal set points with local conditions; outputting dispatch commands for DER control according to the optimal set points when the optimal set points are within appropriate limits with respect to the local conditions; and when the optimal set points exceed the appropriate limits, generating adjusted dispatch commands and outputting the adjusted dispatch commands for the DER control.

20 Claims, 4 Drawing Sheets

MULTI-LAYER ARCHITECTURE FOR CONTROL OF DISTRIBUTED ENERGY RESOURCES

BACKGROUND

Distributed Energy Resources (DER) generally refer to any resource on a distribution system that produces electricity. DER often include natural gas, wind, solar, distributed generation, and demand response resources; whereas coal and nuclear energy tend to be considered conventional resources.

Managing the variability aspect of DER on a power grid is one area of interest due to DER becoming an increasing presence on an electric system. In addition to accounting for peak power usage and multi-directional power flow (e.g., both to the consumer and back to the grid), there is a need for optimizations for carbon impact and economic impact of power distribution.

BRIEF SUMMARY

A multi-layer architecture for control of distributed energy resources (DER) is provided. The multi-layer architecture provides hierarchical control of DERs and combines a forecast-based optimal dispatch engine with one or more on-site controllers performing real-time control. Implementations of the multi-layer architecture can achieve economic, reliable, and sustainable operation of a microgrid.

A multi-layer architecture for control of DER includes a forecasting and optimization system and one or more site-level controllers.

The forecasting and optimization system includes a network interface; a storage system; and a predictive control application stored on the storage system that, when executed, directs the forecasting and optimization system to: generate predictions of optimal set points according to specified objectives, such as economic objectives (e.g., lower overall energy operational costs) and reduction of carbon emissions, and communicate the optimal set points to the one or more site-level controllers via the network interface.

A site-level controller can include a processor; a storage system; instructions stored at the storage system that when executed by the processor direct the site-level controller to perform optional site-specific controls, a boundary check, and a real-time dispatch logic; a field input interface; a field output interface; and a set point interface.

The site-specific controls can involve receiving field inputs via the field input interface, outputting load control commands via the field output interface, and providing local data for the boundary check. In some cases, the site-specific controls can include a real-time load control.

The boundary check receives the optimal set points from the forecasting and optimization system via the set point interface, compares the optimal set points to the local data to determine whether the optimal set points are within appropriate limits or exceed the appropriate limits, notifies the real-time dispatch logic when the optimal set points exceed the appropriate limits, and outputs dispatch commands via the field output interface when the optimal set points are within the appropriate limits.

The real-time dispatch logic generates adjusted dispatch commands in response to being notified by the boundary check, and outputs the adjusted dispatch commands for the DER via the field output interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
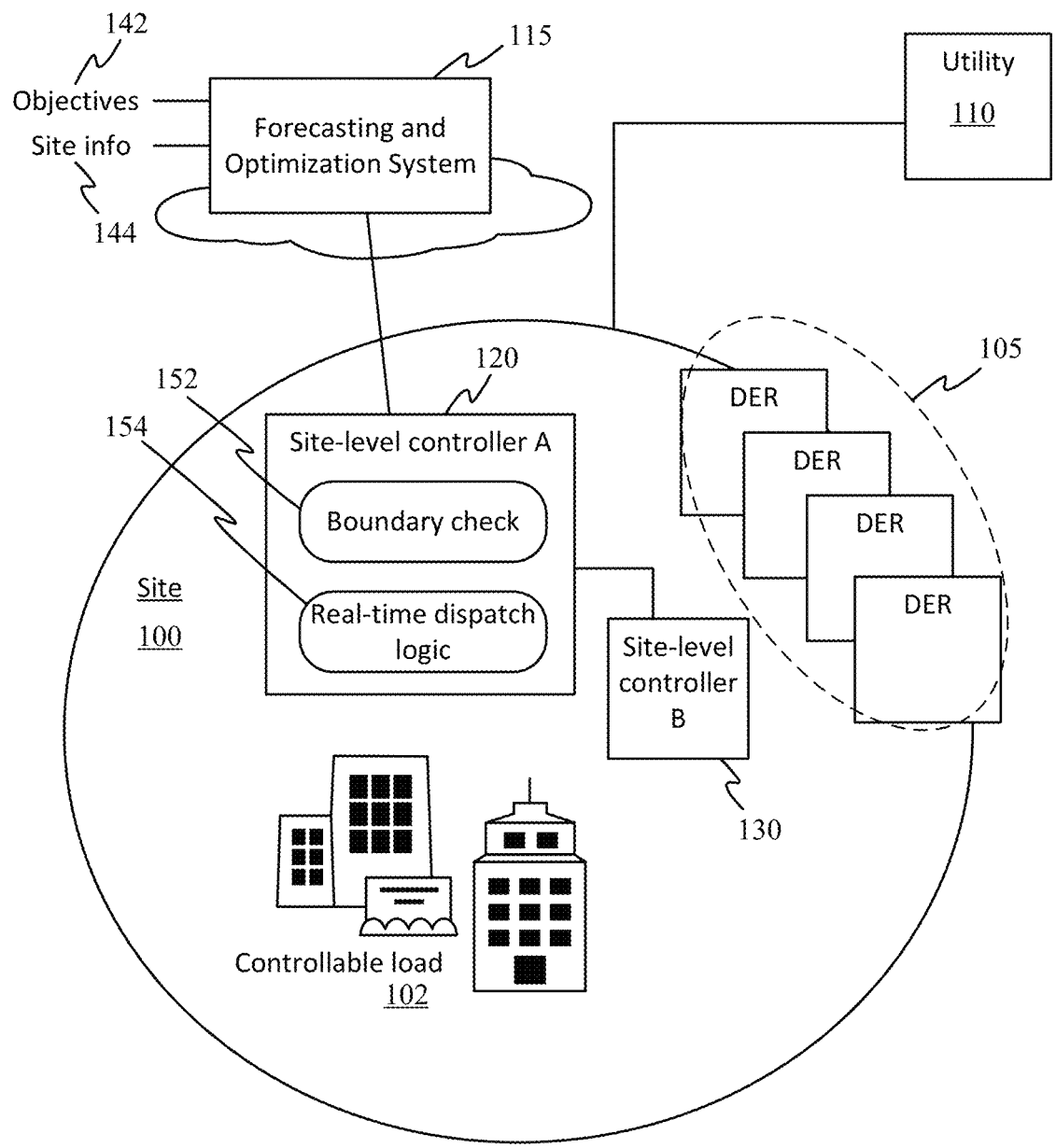
FIG. 1 illustrates an operating environment of a multi-layer architecture for control of distributed energy resources.

A multi-layer architecture for control of distributed energy resources (DERs) is provided. The multi-layer architecture provides hierarchical control of DERs and combines a forecast-based optimal dispatch engine with one or more on-site controllers performing real-time control. Implementations of the multi-layer architecture can achieve economic, reliable, and sustainable operation of a microgrid. An objective can be set for optimization by a forecasting and optimization system layer of the multi-layer architecture and real-time conditions on-site can be accounted for by one or more on-site controller layers of the multi-layer architecture. Through the described architecture it is possible to apply and adapt for any objective, such as economic objectives (e.g., lower overall energy operational costs) and reduction of carbon emissions.

As mentioned above, DER generally refers to any resource on a distribution system that produces electricity. DER often include natural gas, wind, solar, distributed generation, and demand response resources, whereas coal and nuclear energy tend to be considered conventional resources (although it is possible that smaller-scale coal and nuclear energy resources could be part of DER in the future). Terms used in describing DER and their locations include the following.

Distribution generation (DG) includes one or more generating units at a single location owned and/or operated by a distribution utility or a merchant utility.

Behind the Meter Generation (BTMG) includes one or more generating units at a single location on a customer's side of a retail meter that serves all or part of the customer's retail load with electrical energy.

Energy Storage Facility (ES) includes one or more energy storage devices at a single location on either the utility side or the customer's side of the retail meter. ES can be any of various technology types, including electric vehicle charging stations.

DER aggregation (DERA) refers to a virtual resource formed by aggregating multiple DG, BTMG, or ES devices at different points of interconnection on a distribution system. A Bulk Electric System may model a DERA as a single resource at its "virtual" point of interconnection even though individual DER of the DERA may be located elsewhere.

Microgrid refers to an aggregation of multiple DER types behind the customer meter at a single point of interconnection that has the capability to island. A microgrid may range in size and complexity from a single "smart" building to a university campus or industrial/commercial park.

Cogeneration refers to the production of electricity from steam, heat, or other forms of energy produced as a by-product of another process.

Back-Up generation (BUG) includes one or more generating units at a utility side of a customer retail meter that serve in times of emergency at locations.

Site operators, such as facility managers at data centers, would like to have a way to achieve certain objectives such as lower operational expenses while still maintaining their standards of reliability, sustainability and resiliency. In addition, site operators may desire to maximize sustainability (through increased use of renewable energy) and reduce carbon emissions. In most cases, the dispatch strategy that is present on-site is based on a static schedule that does not adapt to the constantly changing conditions in the field (e.g., in load patterns, renewable energy patterns).

A typical microgrid economic dispatch engine consists of a forecast based optimal dispatch algorithm. However, often there is a mismatch between forecast and actual system conditions, which leads to suboptimal operation of the system.

Advantageously, through certain implementations of the multi-layer architecture described herein, it is possible to provide an operator a hands-off ability to lower operational expenses and alternatively or simultaneously minimize carbon emissions while still guaranteeing high standards of power system reliability and resiliency.

FIG. 1 illustrates an operating environment of a multi-layer architecture for control of distributed energy resources. Referring to FIG. 1, a site 100 with a controllable load 102 (e.g., with powered buildings, equipment, etc.) can be on a microgrid utilizing DER 105 and power from a utility 110. A multi-layer architecture for control of the DER, such as DER 105, includes a forecasting and optimization system 115 and one or more site-level controllers (e.g., site-level controller A 120 and site-level controller B 130).

Figure 4:
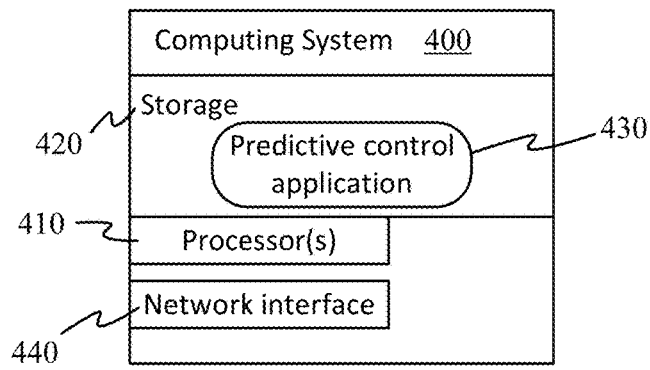
FIG. 4 illustrates a representation of a forecasting and optimization system.

The forecasting and optimization system 115 may be embodied by a central server on site 100, remote from the site 100, or in the cloud. In one implementation, the forecasting and optimization system 115 is implemented as a computing system such as illustrated in FIG. 4.

Figure 5:
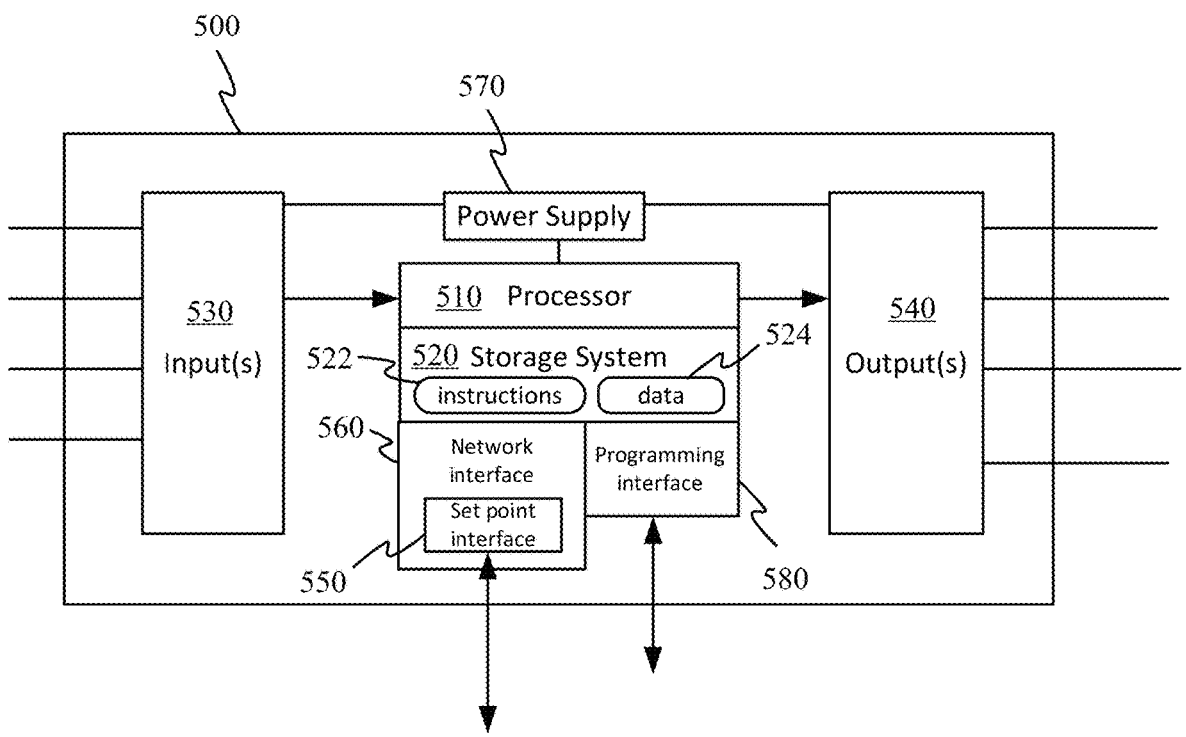
FIG. 5 illustrates a schematic representation of a site-level controller.

The one or more site-level controllers (e.g., site-level controller A 120 and site-level controller B 130) can be embodied as any suitable controller. An on-site controller can include one or more processors such as, but not limited to, general purpose central processing units (CPUs), graphics processing units (GPUs), field programmable gate arrays (FPGAs), application specific processors, and logic devices, as well as any other type of processing device, combinations, or variations thereof. In some cases, operations carried out by the on-site controller are stored as instructions in a storage system, which can include physical storage devices that are removable and/or built in with the one or more processors. A storage system for an on-site controller may include dynamic, static, read/write, read-only, random-access, sequential-access, location-addressable, file-addressable, and/or content-addressable devices, such as optical memory (e.g., CD, DVD, HD-DVD, Blu-Ray Disc, etc.), semiconductor memory (e.g., RAM, SRAM, DRAM, ROM, EPROM, EEPROM, FLASH memory, etc.), and/or magnetic memory (e.g., hard-disk drive, floppy-disk drive, tape drive, MRAM, etc.). It should be understood that a storage device or a storage medium of the storage system includes one or more physical devices and excludes propagating signals per se. Aspects of the on-site controller may be integrated together into one or more hardware-logic components. Such hardware-logic components may include FPGAs, program- and application-specific integrated circuits (PASIC/ASICs), program- and application-specific standard products (PSSP/ASSPs), system-on-a-chip (SOC), and complex programmable logic devices (CPLDs), for example. In one implementation, a site-level controller is embodied by a programmable logic controller (PLC) such as illustrated in FIG. 5.

The forecasting at the forecasting and optimization system 115 can involve predictions for the load at the site 100 (as well as the energy that may be generated by the DER 105 (e.g., the generation of energy by photovoltaic cells and/or other DER). The predictions and optimizations performed by the forecasting and optimization system are provided to the one or more site-level controllers (e.g., site-level controller A 120 and site-level controller B 130), which then perform real-time operations to account for the local conditions (and desired objectives).

As part of the top level of the multi-level, hierarchical, approach, information on objectives 142 and the specifications of the site and region 144 can be provided to the forecasting and optimization system. The information on objectives 142 can be used to determine which algorithms and/or parameters to apply. For example, when a specified objective is to reduce carbon emission, an algorithm for sustainability may try to schedule dispatch of DERs in such a way to reduce carbon emission. As another example, when a specified objective is to reduce electricity cost, an algorithm focusing on economic dispatch may try to reduce electricity consumption in a manner to reduce electricity cost. The forecasting and optimization system 115 can receive input on the specifications of the site and region 144 including, but not limited to, historical data of load and/or energy generation at a site, weather prediction with respect to a particular location (e.g., weather forecasts from a third party source), information on assets at the site (e.g., available physical resources and physical limitations including capacity and ratings of an asset), tariff structure (e.g., dollars per kilowatt hour—flat rate and/or variable rate—charged by utility), carbon market information and emission rate of carbon (e.g., marginal emission rate and marginal emission cost), and even any scheduled utility outages or scheduled maintenance of DER.

As some examples of a physical resource and its physical limitations, a diesel generator may have fuel efficiency limitations and a solar battery inverter may have limitations relating to kilowatt hour and battery capacity (and power rating).

In some cases, the input to the forecasting and optimization system 115 is provided via application programming interface(s) APIs (e.g., via communication with weather prediction API). In some cases, information about a particular site, including specific location (e.g., GPS coordinates, address) and assets, may be entered via a human-machine interface, such as a graphical user interface of an application for the forecasting and optimization system 115.

As part of a lower level of the multi-level, hierarchical, approach, the information from the forecasting and optimization system 115, in the form of optimal set points for dispatch control, is used on-site, taking into consideration the local conditions. The optimal set points can be provided from the forecasting and optimization system 115 in batches periodically, at designated times, based on certain triggers, or on a second-by-second basis, depending on implementation. A site-level controller, such as site-level controller A 120 includes a boundary check 152 and real-time dispatch logic 154.

The boundary check 152 receives the optimal set points generated by the forecasting and optimization system 115, compares the optimal set points to local data to determine whether the optimal set points are within appropriate limits or exceed the appropriate limits, notifies the real-time dispatch logic 154 when the optimal set points exceed the appropriate limits, and outputs dispatch commands when the optimal set points are within the appropriate limits. The local data can include DER ratings, DER generation metered values, utility tariff, carbon emission rates, among other information.

The real-time dispatch logic 154 generates adjusted dispatch commands in response to being notified by the boundary check 152, and outputs the adjusted dispatch commands for the DER. The real-time dispatch logic 154 can generate adjusted optimal set points by using logic and knowledge-based rules (static and/or dynamic).

Site-level controllers can further include functionality for real-time load control, for example, a real-time load control can be provided at one or both of site-level controller A 120 and site-level controller B 130 to output load control commands to the load 102. The real-time load control can, in some cases, also provide local data for the boundary check 152.

In some cases, the functionality of the site-level controllers is distributed between the site-level controllers. For example, site-level controller A 120 can include the function for the boundary check 152 and the real-time dispatch logic 154 and site-level controller B 130 can include fine control features to output dispatch commands to particular resources and/or loads. As another example, site-level controller A 120 can include the boundary check 152 function and site-level controller B 130 can include the real-time dispatch logic 154. In some cases, both site-level controller A 120 and site-level controller B 130 include respective boundary check functions and real-time dispatch logic in order to account for different needs or regions of the site.

Figure 2:
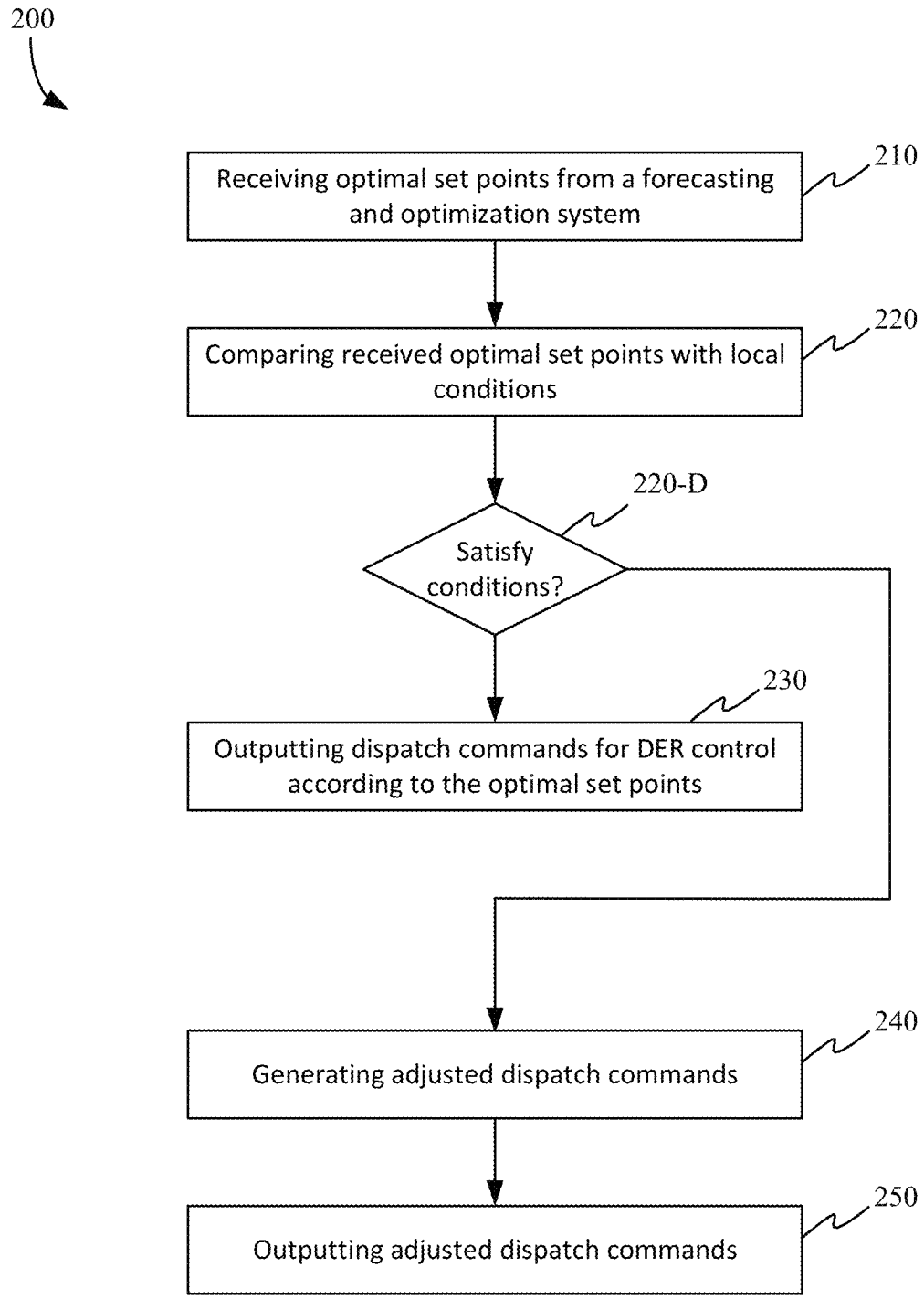
FIG. 2 illustrates a process flow for controlling DER.

FIG. 2 illustrates a process flow for controlling DER. Referring to FIG. 2, one or more site-level controllers (e.g., site-level controller A 120 of FIG. 1) can perform a process 200 including receiving (210) optimal set points from a forecasting and optimization system (e.g., forecasting and optimization system 115 of FIG. 1), comparing (220) received optimal set points with local conditions; outputting (230) dispatch commands for DER control according to the optimal set points when the optimal set points are within appropriate limits with respect to the local conditions; and when the optimal set points exceed the appropriate limits, generating (240), at the site-level controller, adjusted dispatch commands and outputting (250) the adjusted dispatch commands for the DER control.

Accordingly, in process 200, a decision 220-D can be made based on the result of the comparing step (operation 220) as to whether the comparison satisfied conditions of, in the illustrated case, being within appropriate limits or exceeding the appropriate limits.

In some cases, additional operations can be carried out by the one or more site-level controllers as part of the operations controlling DER. For example, with reference to FIG. 1, the boundary check 152 can further check whether there is a communication error between the forecasting and optimization system 115 and the site-level controller, check whether the optimal set points are valid values; check whether objectives are being met, or a combination thereof.

For example, the boundary check 152 can further include checking whether there is a communication error between the forecasting and optimization system 115 and the site-level controller (e.g., site-level controller A 120); and when there is not the communication error, outputting dispatch commands according to a result of comparing the received optimal set points with the local conditions. In some cases, when there is the communication error, the boundary check can notify the real-time dispatch logic 154 to generate the adjusted dispatch commands and output the adjusted dispatch commands for the DER control. In some cases, when there is the communication error, the boundary check 152 can request new optimal set points from the forecasting and optimization system 115.

As another example, the boundary check 152 can further include checking whether the received optimal set points are valid values; and when the received optimal set points are determined to be the valid values, outputting dispatch commands according to a result of comparing the received optimal set points with the local conditions. Valid values refer to values indicative of data (e.g., the optimal set points) as opposed to being all zeros or other value indicative of missing or incomplete or corrupt data. In some cases, when the received optimal set points are not determined to be the valid values, the boundary check 152 can notify the real-time dispatch logic 154 to generate the adjusted dispatch commands and output the adjusted dispatch commands for the DER control. In some cases, when the received optimal set points are not determined to be the valid values, the boundary check 152 can request new optimal set points from the forecasting and optimization system 115.

In some cases, when the boundary check 152 is checking whether objectives are being met, the objectives can include demand surge savings, grid services, time varying energy tariff savings, reverse flow to utility, carbon reduction, or a combination thereof. Indeed, it is possible to create a maximum value from the various assets to meet objectives including lowering energy cost or the electricity cost for the site owner. For example, it is possible to intelligently manage the charging and discharging of batteries so that it is possible to optimize use of solar PV on a rooftop. And if the utility tariff structure varies as a function of time, then it is possible to use the battery most effectively so that the reliance on the utility power is limited to the regions of lowest tariff. Thus, whenever the utility tariff is high, then the battery can be used to meet the load of the site. When the utility tariff is low, then the utility can be used to meet the load of the site. The particular objectives (e.g., "specified objectives") can be provided to the forecasting and optimization algorithm at the forecasting and optimization system 115 for use in generating optimal set points and the actual activity at the site can be used to confirm whether or not the objectives are being met. In some cases, aspects of the objectives can be applied at the real-time dispatch logic 154.

Figure 3:
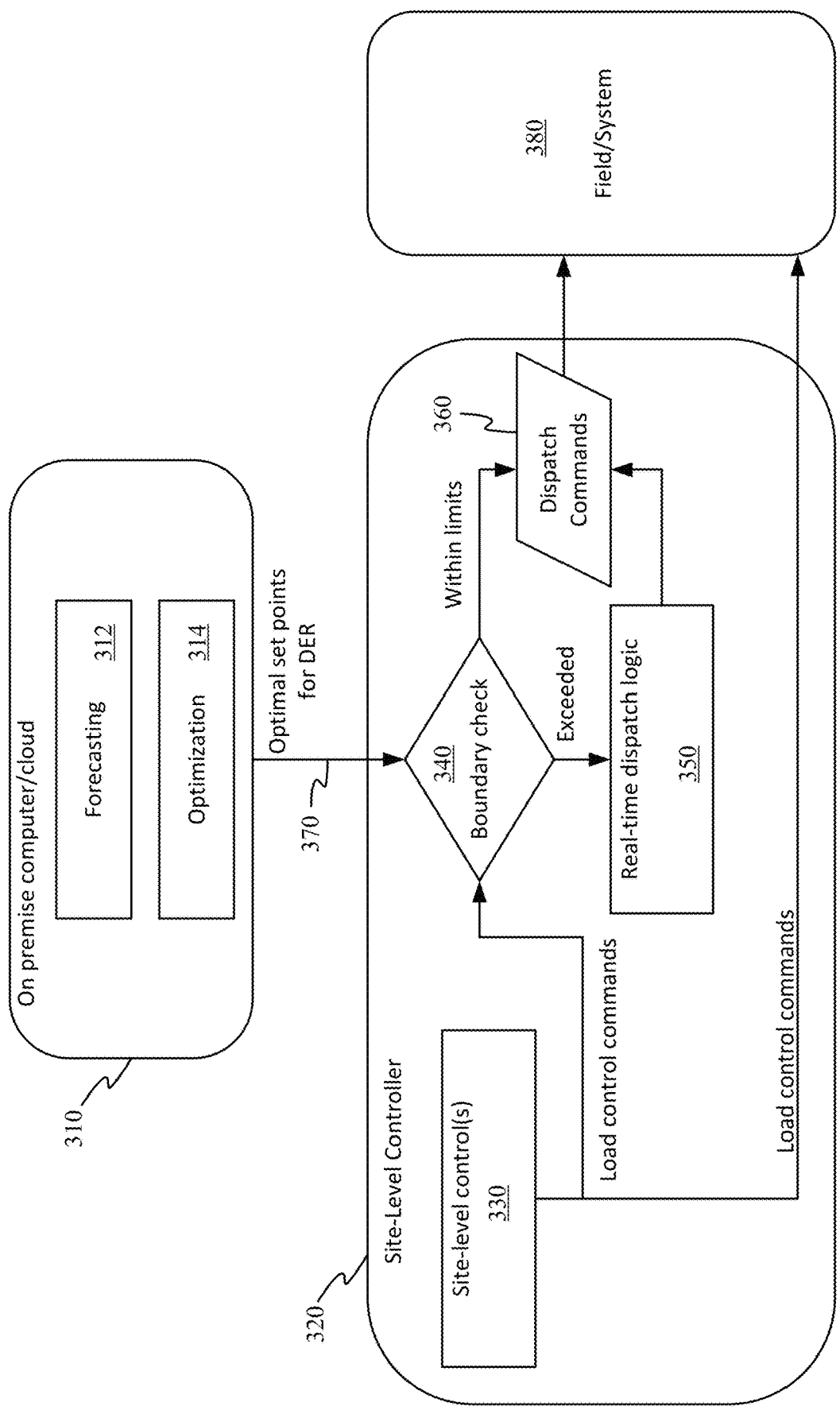
FIG. 3 illustrates an example implementation of a multi-layer architecture for control of distributed energy resources.

FIG. 3 illustrates an example implementation of a multi-layer architecture for control of distributed energy resources. Referring to FIG. 3, an example architecture includes a forecasting and optimization system 310 providing a server/cloud-based forecast dependent optimal dispatch algorithm and a site-level controller 320 providing a real time load and dispatch algorithm. Although a single forecasting and optimization system 310 and a single site-level controller 320 is shown, in some cases, there can be a distributed primary, secondary, and tertiary control that can be distributed between two or three layers. The illustrated scenario shows a double layer architecture, but as mentioned above, additional layers are possible and can include one or two additional layers of site-level controllers. The forecasting and optimization system 310 can include a network interface, a storage system, and a predictive control application (e.g., forecasting application 312 and optionally optimization application 314) stored on the storage system that, when executed, directs the forecasting and optimization system to generate predictions of optimal set points, and communicate the optimal set points to the site-level controller 320 via the network interface. The optimal set points correspond to dispatch points for assets at a site managed using the site-level controller 320.

The site-level controller 320 provides a platform for performing site-specific control 330, a boundary check 340, and a real-time dispatch logic 350, including processes described with respect to method 200 of FIG. 2.

For example, the site-specific controls 330 can receive field inputs (e.g., via field input interface 530 of FIG. 5), output load control commands ("dispatch commands" 360) (e.g., via field output interface 540 of FIG. 5), and provide local data (and load control commands) for the boundary check 340. The site-specific controls 330 run in real time and can send load control commands directly to the field 380, for example by including real-time load control. As mentioned above, the local data can include DER ratings, DER generation metered values, utility tariff, and carbon emission rates among other information. The local data can include actual load to metered value, battery charge from DER, and whether the DER are offline or online, as examples. For example, photovoltaic cells may be offline during certain periods.

The boundary check 340 receives the optimal set points 370 from the forecasting and optimization system 310 via a set point interface (e.g., set point interface 550 of FIG. 5), compares the optimal set points to the local data to determine whether the optimal set points are within appropriate limits or exceed the appropriate limits, notifies the real-time dispatch logic 350 when the optimal set points exceed the appropriate limits, and outputs dispatch commands 360 to the field/system 380 via the field output interface when the optimal set points are within the appropriate limits.

The real-time dispatch logic 350 generates adjusted dispatch commands in response to being notified by the boundary check, and outputs the adjusted dispatch commands (as the dispatch commands 360) for the field/system 380 of DER via the field output interface. The real-time dispatch logic 350 can generate adjusted optimal set points by using logic and knowledge-based rules (static and/or dynamic).

The optimal set points can be received from the on-site, remote, or cloud-based forecasting and optimization system 310 via a network interface of the site-level controller (e.g., set point interface 550/network interface 560 of FIG. 5). The comparing of the received optimal set points with the local conditions is performed on a second-by-second basis.

FIG. 4 illustrates a representation of a forecasting and optimization system. Referring to FIG. 4, a forecasting and optimization system 400 can include one or more processors 410, a storage system 420, and a network interface 440. A predictive control application 430 can be stored on the storage system 420 that when executed by the one or more processors 410 direct the forecasting and optimization system 400 to perform any suitable methods for generating predictions of optimal set points and to communicate the optimal set points to site-level controllers via the network interface 440.

System 400 may be implemented within a single computing device or distributed across multiple computing devices or sub-systems that cooperate in executing program instructions. The system 400 can include one or more blade server devices, standalone server devices, personal computers, routers, hubs, switches, bridges, firewall devices, intrusion detection devices, mainframe computers, network-attached storage devices, and other types of computing devices.

The one or more processors 410 may be implemented within a single processing device but may also be distributed across multiple processing devices or sub-systems that cooperate in executing program instructions.

Storage system 420 can include any computer readable storage media readable by processor(s) 410 and capable of storing application 430 and data. Storage system 420 may be implemented as a single storage device but may also be implemented across multiple storage devices or sub-systems co-located or distributed relative to each other. Storage system 420 may include additional elements, such as a controller, capable of communicating with processor(s) 410.

In embodiments where the system 400 includes multiple computing devices, the system 400 can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

Network interface 440 may provide communication connections and devices that allow for communication between system 400 and other computing systems over a communication network or collection of networks or the air.

FIG. 5 illustrates a schematic representation of a site-level controller. Referring to FIG. 5, a site-level controller 500 can include a processor 510; a storage system 520 storing instructions 522 for DER control and, optionally, data 524; a field input interface 530; a field output interface 540; and a set point interface 550. The set point interface 550 can be operatively coupled to a network interface 560 for communication with a forecasting and optimization system in order to receive optimal set points. The site-level controller 500 can also include a power supply 570 (e.g., a battery and/or AC to DC converter) and a programming interface 580 (through which instructions can be loaded onto the storage system. As illustrated, the site-level controller 500 can be embodied as a PLC.

The field input interface 530 can receive signals from connected devices at a microgrid, including but not limited to buttons, switches (e.g., proximity switches or photoelectric switches that can sense presence of object, limit switches, condition switches to indicate detection of pressure, temperature, etc.), and sensors (e.g., simple sensors such as temperature sensor or pressure sensor, complex sensors such as positioning systems or machine vision systems). Other inputs can be received via the field input interface 530 directly or via the network interface 560, including information from other PLCs or controllers.

The processor 510 processes the received signals according to the instructions 522 stored at the storage system 520 and outputs control signals via the field output interface 540.

The field output interface 540 may be coupled to elements such as, but not limited to, as indicators (e.g., lamps), sirens, electric motors, pneumatic or hydraulic pumps, and magnetic relays.

The storage system 520 can be one or more of any suitable storage medium including volatile (e.g., random access memory such as DRAM and SRAM) and non-volatile memory (e.g., flash memory, ferroelectric or magnetic random-access memory). As mentioned above, the storage system 520 can include the instructions 522 and data 524, including any data received by an input to the controller that is used by the controller 500. The instructions 522 stored at the storage system 520 can, when executed by the processor 510, direct the site-level controller 500 to perform a boundary check and/or real-time dispatch logic as described with respect to FIG. 1; or the site-specific control, boundary check, and real-time dispatch logic such as described with respect to FIG. 3. In some cases, an operating system can be included as executable instructions stored on the storage system 520.

The programming interface 580 can include a serial port or other interface that can couple to a programming device for loading program instructions, such as instructions 522, (and optional data) into the storage system. The controller 500 can be ruggedized, providing tolerance of environmental conditions such as dust, moisture, heat, cold, and radiation.

A number of use cases are possible through the above-described multi-layered architecture. For example, an energy cost minimization use case is possible. There are generally two aspects to the energy cost. One is the time of the day with respect to use. At different times of the day there can be different data of site use from the utility (the "energy cost component" of the utility). The other aspect is the demand component. For example, the maximum demand consumed in a particular month can be challenging to address because some days might have higher usage than other days. Minimizing demand on the utility and minimizing energy cost can be achieved by using advanced forecasting algorithms to estimate the kind of the demand that can be projected for that particular month and, based on the estimated demand, use feedback from the on-premises PLC to adjust the limits and control for the optimal set points.

As can be seen, through a multi-layered architecture, the computational complexity has been removed from the controller at the site while taking advantage of the advanced control of the forecasting and optimizing algorithms. Thus, the described systems can have the accuracy with the ability to predict future needs and take control actions to address them while leveraging simple PLC-based (or other site-level controller) controls, which can accurately capture the small differences between what is happening in the field and the forecasted state of operation. Through this hierarchical architecture, it is possible to customize optimizations for a variety of different regions having different local conditions while using the same underlying architecture.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A multi-layer architecture for control of distributed energy resources (DER), comprising:
a forecasting and optimization system comprising:
a network interface;
a storage system; and
a predictive control application stored on the storage system that, when executed, directs the forecasting and optimization system to:
generate predictions of optimal set points, and
communicate the optimal set points to a site-level controller via the network interface, wherein the forecasting and optimization system is remote from the site-level controller; and
the site-level controller, wherein the site-level controller provides control signals that control application of one or more distributed energy resources to a load on a micro-grid, the site-level controller comprising:
a processor;
a site-level controller storage system;
instructions stored at the site-level controller storage system that when executed by the processor direct the site-level controller to perform a boundary check and a real-time dispatch logic;
a field input interface;
a field output interface; and
a set point interface;
wherein:
the boundary check receives the optimal set points from the forecasting and optimization system via the set point interface, compares the optimal set points to local data to determine whether the optimal set points are within set limits or exceed the set limits, notifies the real-time dispatch logic when the optimal set points exceed the set limits, and outputs dispatch commands to control application of at least one distributed energy resource of the one or more distributed energy resources to the load via the field output interface when the optimal set points are within the set limits; and
the real-time dispatch logic generates adjusted dispatch commands in response to being notified by the boundary check, and outputs the adjusted dispatch commands via the field output interface, thereby adjusting operation of the at least one distributed energy resource of the one or more distributed energy resources.

2. The multi-layer architecture of claim 1, wherein the boundary check further checks whether there is a communication error between the forecasting and optimization system and the site-level controller, checks whether the optimal set points are valid values; and checks whether objectives are being met.

3. The multi-layer architecture of claim 2, wherein the objectives include one or more of demand surge savings, grid services, time varying energy tariff savings, and reverse flow to utility.

4. The multi-layer architecture of claim 2, wherein the objectives include carbon reduction.

5. The multi-layer architecture of claim 1, wherein the local data comprises DER ratings, DER generation metered values, utility tariff, carbon emission rates, or a combination thereof.

6. The multi-layer architecture of claim 1, wherein the boundary check performs the comparison of the optimal set points to the local data on a second-by-second basis.

7. The multi-layer architecture of claim 1, further comprising instructions stored at the site-level controller storage system that when executed by the processor direct the site-level controller to perform site-specific controls, wherein the site-specific controls receive field inputs via the field input interface, output load control commands via the field output interface, and provide local data for the boundary check.

8. A site-level controller that provides control signals that control application of one or more distributed energy resources to a load on a micro-grid, the site-level controller comprising:
- a processor;
- a storage system;
- instructions stored at the storage system that when executed by the processor direct the site-level controller to perform a boundary check and a real-time dispatch logic;
- a field input interface;
- a field output interface; and
- a set point interface;
- wherein:
  - the boundary check receives optimal set points via the set point interface, compares the optimal set points to local data to determine whether the optimal set points are within set limits or exceed the set limits, notifies the real-time dispatch logic when the optimal set points exceed the set limits, and outputs dispatch commands to control application of at least one distributed energy resource of the one or more distributed energy resources to the load via the field output interface when the optimal set points are within the set limits; and
  - the real-time dispatch logic generates adjusted dispatch commands in response to being notified by the boundary check, and outputs the adjusted dispatch commands via the field output interface, thereby adjusting operation of the at least one distributed energy resource of the one or more distributed energy resources.

9. The site-level controller of claim 8, further comprising instructions stored at the storage system that when executed by the processor direct the site-level controller to perform site-specific control, wherein the site-specific control receives field inputs via the field input interface, outputs load control commands via the field output interface, and provides local data for the boundary check.

10. The site-level controller of claim 8, further comprising a site-level controller network interface, wherein the set point interface is operatively coupled to the site-level controller network interface for communication with a forecasting and optimization system in order to receive the optimal set points, wherein the forecasting and optimization system is remote from the site-level controller.

11. The site-level controller of claim 10, wherein the boundary check further checks whether there is a communication error between the forecasting and optimization system and the site-level controller, checks whether the optimal set points are valid values; and checks whether objectives are being met.

12. The site-level controller of claim 11, wherein the objectives include one or more of carbon reduction, demand surge savings, grid services, time varying energy tariff savings, and reverse flow to utility.

13. A method of distributed energy resource (DER) control, comprising:
- receiving, at a site-level controller that provides control signals that control application of one or more distributed energy resources to a load on a micro-grid, optimal set points, from a forecasting and optimization system that is remote from the site-level controller;
- comparing received optimal set points with local conditions;
- outputting, by the site-level controller, dispatch commands to control application of at least one distributed energy resource of the one or more distributed energy resources to the load according to the optimal set points when the optimal set points are within set limits with respect to the local conditions; and
- when the optimal set points exceed the set limits, generating, at the site-level controller, adjusted dispatch commands and outputting the adjusted dispatch commands, thereby adjusting the operation of the at least one distributed energy resource of the one or more distributed energy resources.

14. The method of claim 13, further comprising:
generating, at the forecasting and optimization system, the optimal set points according to specified objectives.

15. The method of claim 14, wherein the specified objectives comprise carbon reduction, economic objectives, or a combination thereof.

16. The method of claim 13, wherein the comparing of the received optimal set points with the local conditions is performed on a second-by-second basis.

17. The method of claim 13, further comprising:
- checking whether there is a communication error between the forecasting and optimization system and the site-level controller;
- when there is not the communication error, outputting dispatch commands according to a result of comparing the received optimal set points with the local conditions; and
- when there is the communication error, generating, at the site-level controller, the adjusted dispatch commands and outputting the adjusted dispatch commands.

18. The method of claim 13, further comprising:
- checking whether there is a communication error between the forecasting and optimization system and the site-level controller;
- when there is not the communication error, outputting dispatch commands according to a result of comparing the received optimal set points with the local conditions; and
- when there is the communication error, requesting new optimal set points from the forecasting and optimization system.

19. The method of claim 13, further comprising:
- checking whether the received optimal set points are valid values;
- when the received optimal set points are determined to be the valid values, outputting dispatch commands according to a result of comparing the received optimal set points with the local conditions; and
- when the received optimal set points are not determined to be the valid values, generating, at the site-level controller, the adjusted dispatch commands and outputting the adjusted dispatch commands.

20. The method of claim 13, further comprising:
- checking whether the received optimal set points are valid values;
- when the received optimal set points are determined to be the valid values, outputting dispatch commands according to a result of comparing the received optimal set points with the local conditions; and
- when the received optimal set points are not determined to be the valid values, requesting new optimal set points from the forecasting and optimization system.

* * * * *